US012704154B2

(12) United States Patent
Özçelik

(10) Patent No.: US 12,704,154 B2
(45) Date of Patent: Aug. 11, 2026

(54) PROTECTIVE COVER STRUCTURE FOR THE SLIP ASSEMBLY

(71) Applicant: TIRSAN KARDAN SANAYI VE TICARET ANONIM SIRKETI, Yunusemre (TR)

(72) Inventor: Esra Özçelik, Yunusemre (TR)

( * ) Notice: Subject to any disclaimer, the term of this patent is extended or adjusted under 35 U.S.C. 154(b) by 332 days.

(21) Appl. No.: 18/252,318

(22) PCT Filed: Dec. 1, 2021

(86) PCT No.: PCT/TR2021/051330

§ 371 (c)(1),
(2) Date: May 9, 2023

(87) PCT Pub. No.: WO2022/125035

PCT Pub. Date: Jun. 16, 2022

(65) Prior Publication Data

US 2023/0400067 A1 Dec. 14, 2023

(51) Int. Cl.
*F16D 3/84* (2006.01)
*F16D 3/06* (2006.01)
*F16C 33/72* (2006.01)

(52) U.S. Cl.
CPC ............... *F16D 3/848* (2013.01); *F16D 3/06* (2013.01); *F16C 33/723* (2013.01); *Y10S 277/912* (2013.01)

(58) Field of Classification Search
CPC .......... F16D 3/848; F16D 3/06; F16C 33/723; Y10S 277/912
USPC ................................. 464/133, 167; 277/572
See application file for complete search history.

(56) References Cited

U.S. PATENT DOCUMENTS 3,942,336 A * 3/1976 Schultenkamper ....... F16D 3/06 277/912
4,592,556 A * 6/1986 Nieman ................. F16J 15/164 464/133
7,052,398 B2 * 5/2006 Robb ........................ F16C 3/03 464/16

FOREIGN PATENT DOCUMENTS

CN 203481968 U 3/2014
CN 205697916 U 11/2016
JP H10203188 A 8/1998
KR 101004312 B1 12/2010

OTHER PUBLICATIONS

International Search Report for corresponding PCT/TR2021/051330 dated Mar. 21, 2022.
Written Opinion of the International Searching Authority for corresponding PCT/TR2021/051330 dated Mar. 21, 2022.

* cited by examiner

*Primary Examiner* — Greg Binda
(74) *Attorney, Agent, or Firm* — EGBERT, MCDANIEL & SWARTZ, PLLC

(57) ABSTRACT

A protective cover assembly for a drive shaft has a yoke shaft, a sliding sleeve, a protective cover tube connected to the yoke shaft at an end thereof, a seal positioned to the yoke shaft at one end thereof, a seal positioned at an end of the protective cover tube adjacent the sliding sleeve so as to seal between the protective cover tube and the sliding sleeve, a carrier body connected to the end of said protective cover tube, and a grip surface positioned at a lower end of the carrier body so as to as to connect the carrier body to the protective cover tube. The carrier body contains the seal therein.

1 Claim, 6 Drawing Sheets

PROTECTIVE COVER STRUCTURE FOR THE SLIP ASSEMBLY

FIELD OF THE INVENTION

The present invention relates to the protective covers used in the slip assembly of the drive shaft that provides power transmission in vehicles in the automotive sector. In particular, the present invention relates to a protective cover structure that eliminates the sealing problems in the seal and the operational difficulties experienced in the production of the protective cover tube with the help of the modular connection of the seal, which provides sealing in the slip assembly on the protective cover tube shaped in the form of a straight tube, by means of the carrier body.

STATE OF THE ART

A drive shaft is used between the transmission output shaft and the differential in motor vehicles so as to transmit the power generated in the engine to the differential by rotational movement. It has a slip assembly consisting of yoke shaft, sliding sleeve and protective cover.

In FIG. 6, the slip assembly (K) in the state of the art is seen. The slip assembly (K) in the state of the art mainly consists of the following; the protective cover (K1) in the state of the art which consists of a single tube in a single piece with one end expanded by the mechanical process seen in FIG. 7 and is connected to said expanded end with a seal (K2), sliding sleeve (50) which is intertwined with the yoke shaft (40) and yoke shaft (40) connected to one end of the protective cover (K1) in the state of the art. In order to connect the seal (K2) to the protective cover (K1) in the state of the art, a housing form must be shaped at the end of the protective cover (K1) in the state of the art. In this forming process, runout etc. due to operational difficulties is encountered. In addition, the seal (K2) may be damaged or driven in an inaccurate manner while it is being driven into said housing. In this case, the seal (K2) exerts an excessive pressure on the surface or creates a gap. At the same time, manufacturing for different lengths is only possible with the use of different molds due to connecting the seal (K2) to the housing expanded by the mechanical operation at the end of the protective cover (K1) in the state of the art and the protective cover (K1) in the state of the art being monolithic. This causes additional mold and operational costs in production.

As a result, in order to solve the abovementioned problems and the insufficiency of the current solutions makes it necessary to make a development in the relevant technical field.

AIM OF THE INVENTION

The present invention relates to a protective cover structure for the slip assembly which eliminates the abovementioned disadvantages and brings new advantages to the relevant technical field.

The main aim of the invention is to obtain a protective cover structure that provides a modular connection of the seal in the slip assembly onto the protective cover tube shaped in the form of a straight tube, by means of the carrier body.

The aim of the invention is to eliminate the operational difficulties encountered in the production of protective cover tube.

Another aim of the invention is to eliminate the sealing problems in the seal.

Another aim of the invention is to eliminate the problems experienced in the assembly of the seal, with the help of its straight-form protective cover tube.

Another aim of the invention is to reduce the production costs by eliminating the mechanical expanding operation by producing the protective cover tube in a simple tube cutting line.

Another aim of the invention is to cut the protective cover tube into desired lengths for the production of protective cover in different lengths, eliminating the need for different molds and simplifying the production processes.

Another aim of the invention is to increase production efficiency and to respond to expectations easily and in a short time by using seal structures suitable for different sealing expectations in different vehicle applications by means of the modular connection of the seal on the protective cover tube by means of the carrier body.

Another aim of the invention is to ensure that the costs are reduced by manufacturing different materials from the protective cover tube of the carrier body by means of the modular connection of the seal on the protective cover tube with the carrier body and it is to provide a more rigid and compatible structural relationship between the seal made of elastomer material and the carrier body made of a different material other than metal material.

In order to fulfill all the purposes mentioned above and which may arise from the detailed description, the present invention is protective cover structure of the drive shaft that provides power transmission in vehicles in the automotive sector, which is used in slip assemblies with a yoke shaft and a sliding sleeve, comprising the following;

- a protective cover tube in the form of a straight tube, which is connected to a yoke shaft at one end and a sliding sleeve connected to the same with a yoke shaft,
- double-lipped seal or three-lipped seal or flexible spring-energized seal which are located at the end of the sleeve side of the protective cover tube and provide seal between the protective cover tube and the sliding sleeve,
- carrier body which is connected to the end of the protective cover tube such that double-lipped seal or three-lipped seal or flexible spring-energized seal are contained therein and provides fitting double-lipped seal or three-lipped seal or flexible spring-energized seal into the protective cover tube.

The structural and characteristic features of the present invention will be understood clearly by the following drawings and the detailed description made with reference to these drawings. Therefore, the evaluation shall be made by taking these figures and the detailed description into consideration.

DESCRIPTION OF THE PART REFERENCES

10. Protector cover tube
20*a*. Double-lipped seal
20*b*. Three-lipped seal
20*c*. Flexible spring-energized seal
30. Carrier body
31. Grip surface
40. Yoke shaft
50. Sliding sleeve
K. Slip assembly in the state of the art
K1. Protective cover in the state of the art
K2. Seal

DETAILED DESCRIPTION OF THE INVENTION

In this detailed description, the preferred alternatives of the inventive protective cover structure are described only for clarifying the subject matter such that no limiting effect is created.

Figures 1, 2:
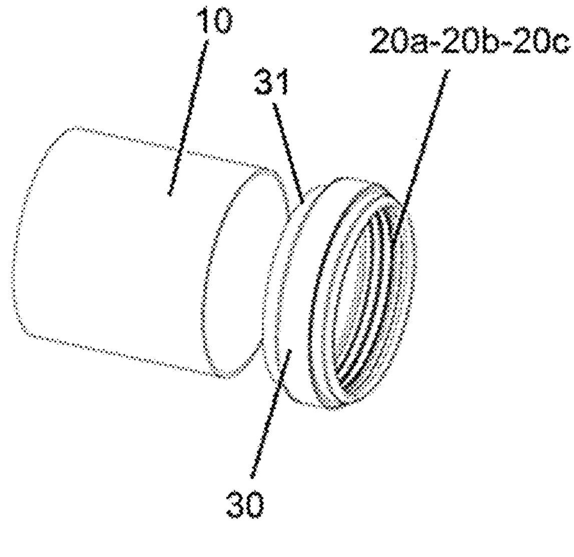
FIG. 1 is a disassembled view of the inventive protective cover of the present invention.
FIG. 2 is an assembled view of the yoke shaft and sliding sleeve in the inventive protective cover of the present invention.

In FIG. 1, the disassembled view of the inventive protective cover is given. Accordingly protective cover mainly comprises the following; a protective cover tube (10) in the form of a straight tube which is connected to a yoke shaft (40) at one end and a sliding sleeve (50) connected to the same with a yoke shaft (40), double-lipped seal (20*a*) or three-lipped seal (2*b*) or flexible spring-energized seal (20*c*) which are connected to the end of the protective cover tube (10) on the side of the sliding sleeve (50) and work on the sliding sleeve (50) and provide sealing, carrier body (30) that connects the end of the protective cover tube (10) to the double-lipped seal (20*a*) or three-lipped seal (2*b*) or the flexible spring-energized seal (20*c*) to the protective cover tube (10).

The protective cover tube (10), which constitutes the main structure of the inventive protective cover structure, is shaped in the form of a straight tube. As can be seen in FIGS. 2, 8*a*, 8*b* and 8*c*, a yoke shaft (40) is connected to one end of the protective cover tube (10). On the other hand, the sliding sleeve (50) is connected to the protective cover tube (10) by passing through the other end of the protective cover tube (10) and being intertwined with the yoke shaft (40). A double-lipped seal (20*a*) or a three-lipped seal (2*b*) or a flexible spring-energized seal (20*c*) is placed at the end of the protective cover tube (10) so as to provide sealing between the protective cover tube (10) and the sliding sleeve (50). The protective cover tube (10) has a shape of a straight tube with a constant diameter along an entire length thereof.

The lips of the double-lipped seal (20*a*) or a three-lipped seal (2*b*) or a flexible spring-energized seal (20*c*) have flexible structure, they are made of different materials to be compatible with the surface where it provides sealing.

Figure 3:
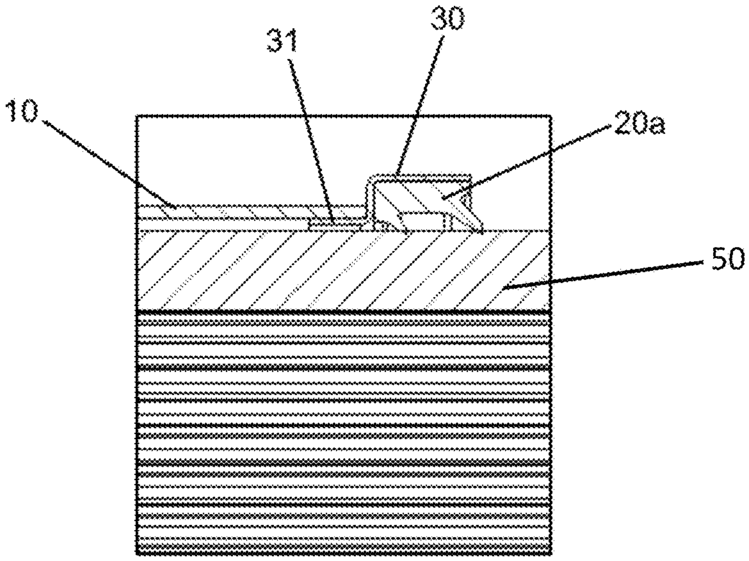
FIG. 3 the is a section view of the double-lipped seal of the inventive protective cover structure, in connection with the end of the protective cover tube.
Figure 4:
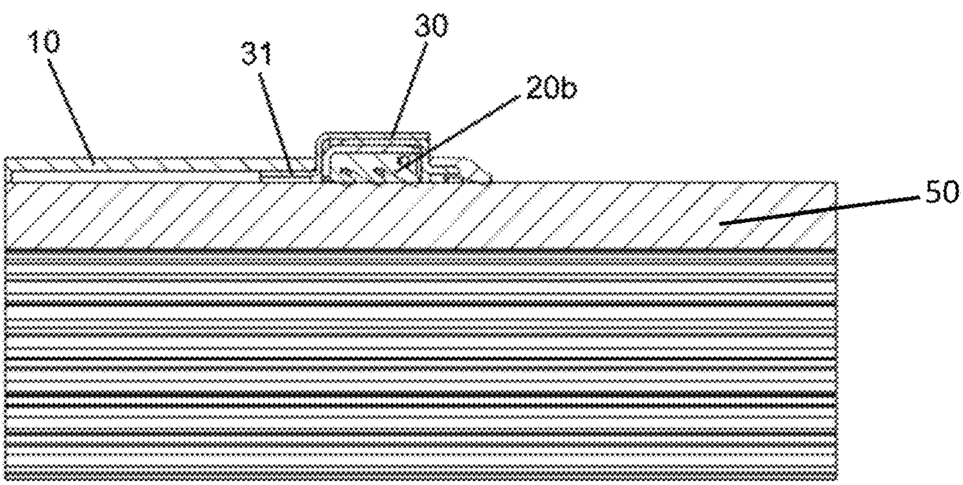
FIG. 4 is a section view of the three-lipped seal of the inventive protective cover structure, in connection with the end of the protective cover tube.
Figure 5:
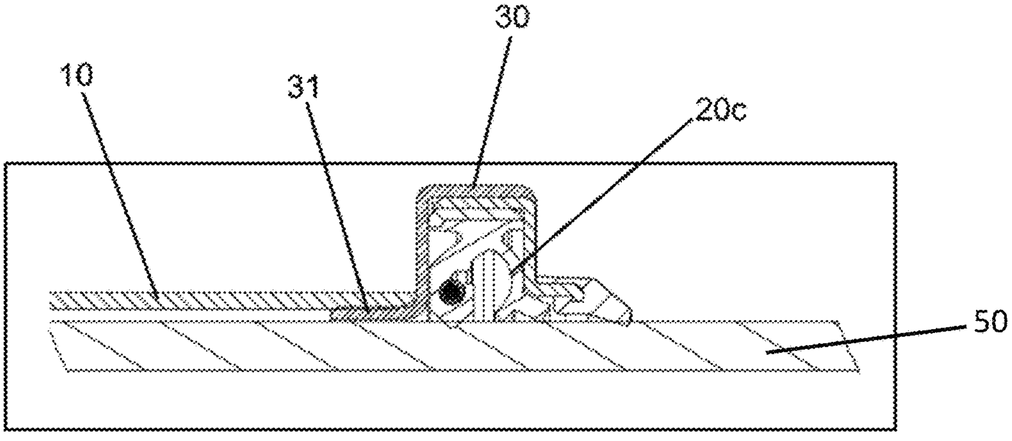
FIG. 5 is a section view of the flexible spring-energized seal of the inventive protective cover structure, in connection with the end of the protective cover tube.
Figure 6:
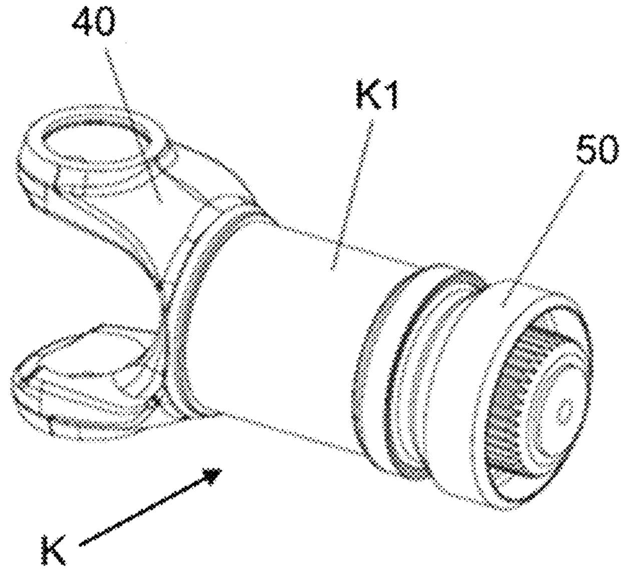
FIG. 6 is a view of the slip assembly in the state of the art.
Figure 7:
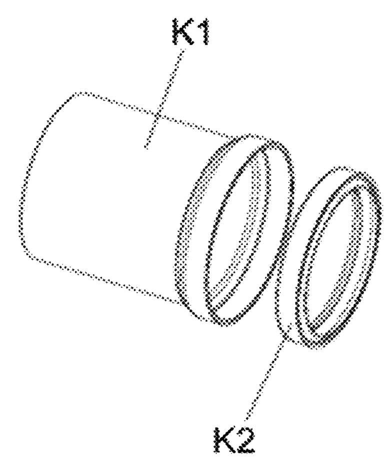
FIG. 7 is a disassembled view of the protective cover and seal in the state of the art of the slip assembly in the state of the art.
Figure 8A:
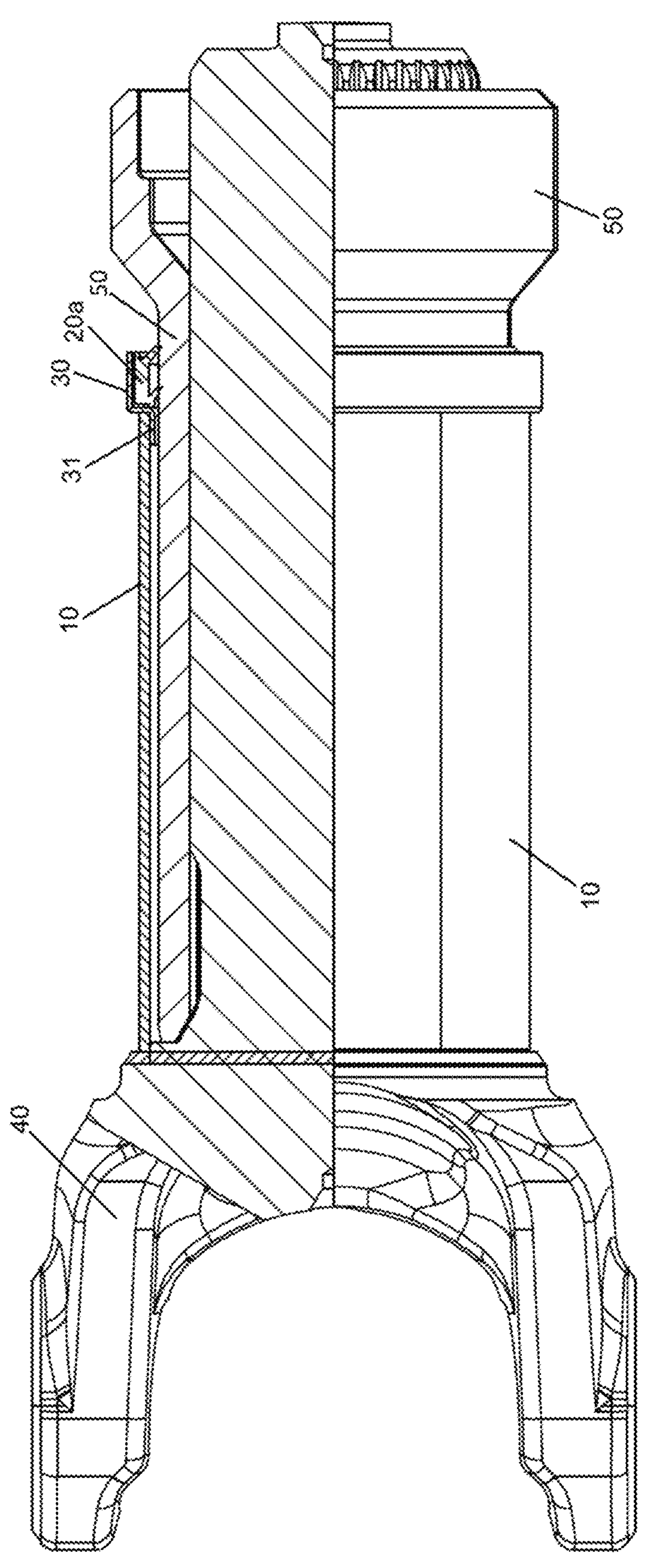
FIG. 8*a* is a section view of the double-lipped seal of the protective cover structure, wherein the sliding sleeve is connected to the yoke shaft.
Figure 8B:
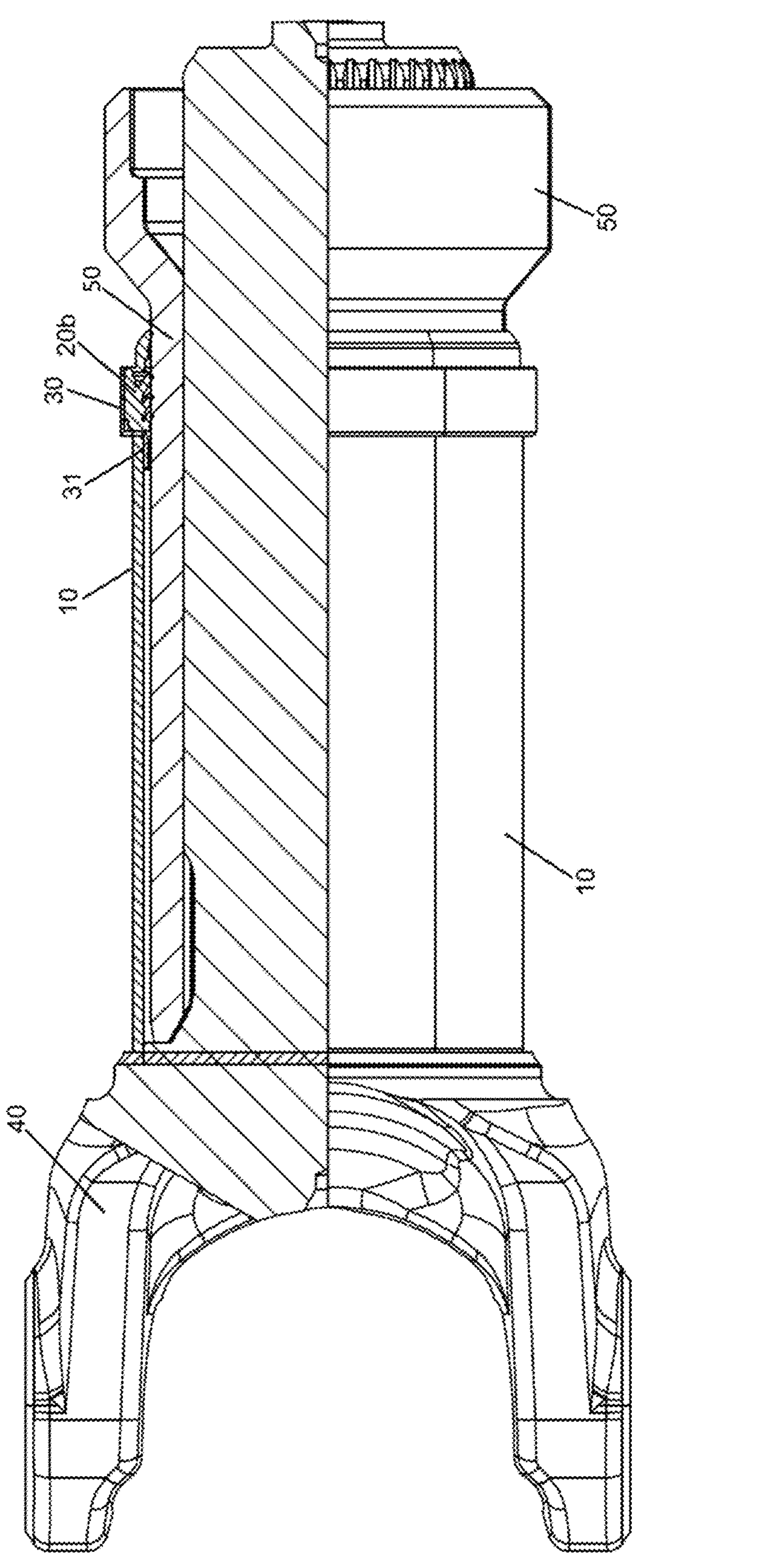
FIG. 8*b* is a section view of the three-lipped seal of the protective cover structure, wherein the sliding sleeve is connected to the yoke shaft.
Figure 8C:
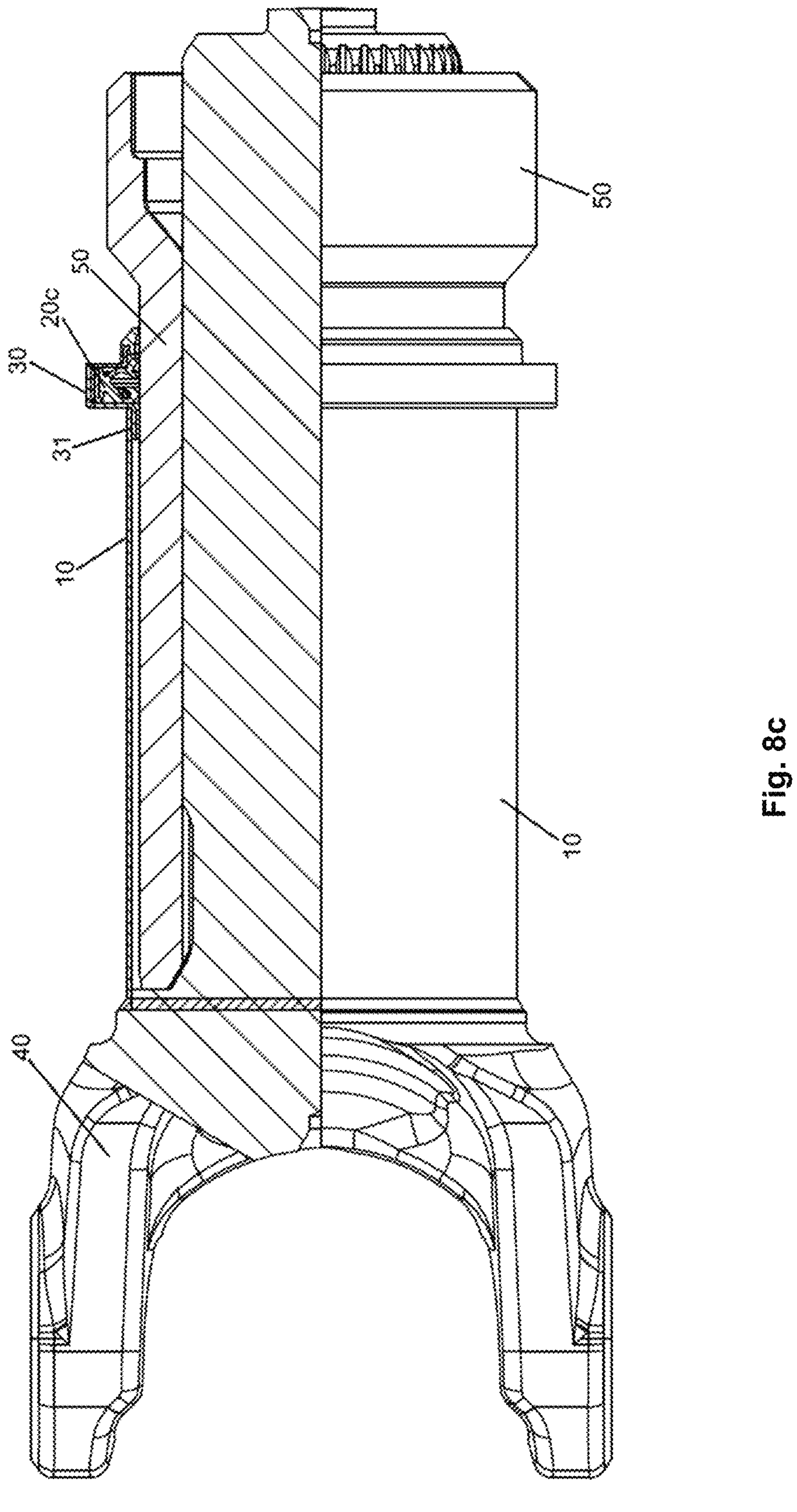
FIG. 8*c* is a section view of the flexible spring-energized seal of the protective cover structure, wherein the sliding sleeve is connected to the yoke shaft.

A carrier body (30) is engaged to the end of the protective cover tube (10) such that it contains the double-lipped seal (20*a*) as seen in FIG. 3, three-lipped seal (20*b*) as seen in FIG. 4 and flexible spring-energized seal (20*c*) as seen in FIG. 5 for fitting double-lipped seal (20*a*) or three-lipped seal (20*b*) or flexible spring-energized seal (20*c*) into end of protective cover tube (10). The grip surface (31) at the lower end of said carrier body (30) extends into the protective cover tube (10). Thus, it is ensured that the carrier body (30) is fixed to the end of the protective cover tube (10).

In the inventive protective cover tube, sealing is provided between the protective cover tube (10) and the sliding sleeve (50) by connecting the double-lipped seal (20*a*) or the three-lipped seal (2*b*) or the flexible spring-energized seal (20*c*) to the end of the protective cover tube (10) in the form of a straight tube by means of the carrier body (30).

The invention claimed is:

1. A protective cover assembly for a drive shaft that provides power transmission in vehicles, the protective cover assembly comprising:

a yoke shaft;

a sliding sleeve;

a protective cover tube having a straight tube shape of constant diameter throughout a length thereof, said protective cover tube being connected to said yoke shaft at an end thereof and to said sliding sleeve at the opposite end via said yoke shaft, said protective cover tube having a shape of a straight tube with a constant diameter along an entire length thereof;

a seal positioned at the opposite end of said protective cover tube adjacent said sliding sleeve, said seal sealing between said protective cover tube and said sliding sleeve, said seal being selected interchangeably from one of a double-lipped seal and a three-lipped seal and a flexible spring-energized seal;

a carrier body being connected to the opposite end of said protective cover tube, said carrier body containing said seal therein such that said seal is fitted into said protective cover tube; and a grip surface positioned at a lower end of said carrier body and extending into said protective cover tube, said grip surface connecting said carrier body to the opposite end of said protective cover tube, said grip surface being an integral protrusion.

* * * * *